United States Patent
De Backer (10) Patent No.: US 11,915,080 B2
(45) Date of Patent: Feb. 27, 2024

(54) REPOSITIONABLE RADIO FREQUENCY IDENTIFICATION DEVICE

(71) Applicant: Avery Dennison Retail Information Services LLC, Mentor, OH (US)

(72) Inventor: Mathieu De Backer, Grottammare (IT)

(73) Assignee: Avery Dennison Retail Information Services LLC, Mentor, OH (US)

( * ) Notice: Subject to any disclaimer, the term of this patent is extended or adjusted under 35 U.S.C. 154(b) by 81 days.

(21) Appl. No.: 17/631,517

(22) PCT Filed: Jul. 30, 2020

(86) PCT No.: PCT/US2020/044155
§ 371 (c)(1),
(2) Date: Jan. 31, 2022

(87) PCT Pub. No.: WO2021/021985
PCT Pub. Date: Feb. 4, 2021

(65) Prior Publication Data
US 2022/0269919 A1    Aug. 25, 2022

Related U.S. Application Data

(60) Provisional application No. 62/880,319, filed on Jul. 30, 2019.

(51) Int. Cl.
*G06K 19/07*   (2006.01)
*G06K 19/077*  (2006.01)

(52) U.S. Cl.
CPC ... *G06K 19/0723* (2013.01); *G06K 19/07758* (2013.01); *G06K 19/07773* (2013.01)

(58) Field of Classification Search
CPC ...................... G06K 19/0723; G06K 19/07773
(Continued)

(56) References Cited

U.S. PATENT DOCUMENTS 7,843,341 B2   11/2010   Phaneuf et al.
7,884,726 B2    2/2011   Cote et al.
(Continued)

FOREIGN PATENT DOCUMENTS

CN    207651077 U     7/2018
DE    102006052516   5/2008
WO    2007/034129    3/2007

OTHER PUBLICATIONS

International Preliminary Report on Patentability dated Feb. 1, 2022 issued in corresponding IA No. PCT/US2020/044155 filed Jul. 30, 2020.

(Continued)

*Primary Examiner* — Allyson N Trail (57) ABSTRACT

An adjustable and repositionable RFID inlay is described herein. The RFID inlay comprises: a) a substrate having a first side and a second side; b) an antenna at least partially disposed on the first side of the substrate, and c) an RFID chip at least partially disposed on the first side of the substrate; wherein a first adhesive is at least partially disposed on the RFID inlay; and wherein a second adhesive is at least partially disposed on the RFID inlay. The second adhesive is an activatable adhesive. Also described herein is a method of positioning an RFID inlay with a first adhesive and a second adhesive where the second adhesive is an activatable adhesive. The method may further comprise repositioning the RFID inlay prior to activating the second adhesive to at least partially affix the RFID inlay to the object.

40 Claims, 3 Drawing Sheets

(58) Field of Classification Search
USPC .......................................................... 235/492
See application file for complete search history.

(56) References Cited

U.S. PATENT DOCUMENTS

| | | | |
|---|---|---|---|
| 8,169,318 B2 | 5/2012 | Atherton | |
| 8,632,016 B2 | 1/2014 | Gunther | |
| 8,936,197 B2 | 1/2015 | Tiedmann et al. | |
| 2007/0210924 A1 | 9/2007 | Arnold et al. | |
| 2007/0228720 A1 | 10/2007 | Saint et al. | |
| 2008/0088448 A1 | 4/2008 | Steidinger | |
| 2008/0117056 A1* | 5/2008 | Forster | G06K 19/07749 |
| | | | 340/572.7 |
| 2009/0250522 A1* | 10/2009 | Williams | H01Q 1/2225 |
| | | | 235/492 |
| 2012/0055998 A1 | 3/2012 | Mieslinger | |
| 2012/0062367 A1 | 3/2012 | Warther | |
| 2015/0227832 A1* | 8/2015 | Diorio | G06K 19/07756 |
| | | | 29/601 |
| 2016/0125286 A1 | 5/2016 | Forslund et al. | |
| 2018/0285704 A1* | 10/2018 | Stewart | G06K 7/10366 |
| 2020/0160137 A1* | 5/2020 | Melo | H01Q 21/10 |
| 2020/0402653 A1* | 12/2020 | Koh | G16H 40/63 |
| 2021/0091474 A1* | 3/2021 | Escaro | G06K 19/07767 |
| 2021/0146369 A1* | 5/2021 | Pham | G01N 35/1009 |
| 2022/0012712 A1* | 1/2022 | Dagdelen Uysal | |
| | | | G06Q 20/3278 |
| 2022/0076093 A1* | 3/2022 | Escaro | G06K 19/07786 |
| 2023/0048347 A1* | 2/2023 | Forster | H01Q 1/2225 |

OTHER PUBLICATIONS

International Search Report and Written Opinion dated Oct. 20, 2020 issued in corresponding IA No. PCT/US2020/044155 filed Jul. 30, 2020.

* cited by examiner

REPOSITIONABLE RADIO FREQUENCY IDENTIFICATION DEVICE

CROSS REFERENCE TO RELATED APPLICATION(S)

The present application is a 371 of international Application No. PCT/US2020/044155, which was published in English on Feb. 4, 2021, and claims benefit of U.S. Provisional Application No. 62/880,319 filed Jul. 30, 2019, both of which are incorporated herein by reference in their entireties.

FIELD

The present disclosure relates generally to radio frequency identification ("RFID") inlays. More particularly, the RFID inlays described herein are directed to the use of adjustable and repositionable adhesives and the methods of applying RFID inlays in a continuous and efficient manner that allows for the placement of a RFID inlay directly onto an object in a temporary manner before permanently affixing the RFID inlay to the object.

BACKGROUND

Radio Frequency Identification (RFID) is the use of radio waves to read and capture information stored on a unique identifier tag attached to an object. Radio frequency identification is commonly used in a wide variety of fields such as, but not limited to, building accessibility and other security applications, inventory management, and product identification.

Typical RFID inlays have an RFID chip (also referred to as a microprocessor) where data is stored which is electrically connected to an antenna that transmits and receives radio waves. For the RFID inlay, the RFID chip, and the antenna are held together by a substrate. In some instances, the RFID inlay may also have an adhesive on a thin layer covering the RFID chip and antenna (which may be referred to as a "wet inlay"). RFID inlays may also be embedded into a paper to form an RFID label. Alternatively, RFID inlays may be encapsulated in certain materials to form an RFID tag.

When used to track or manage inventory, the RFID chip stores unique identifying data associated with the inventory. An operator can use an external receiver/reader to retrieve the stored data and process the inventory from the RFID chip.

Recently, the demand for RFID technology has increased as companies explore alternative business processes to maintain and/or increase profitability. Traditionally, companies have attempted to predict the sales volume of a particular item at a store and then ship a set number or amount of goods to the store based on the sales volume prediction. This business process has the potential to reduce company profitability, as the sales volume prediction may overestimate the demand, resulting in the store having to inventory and maintain the item for a longer time period than desired, or ultimately discard an item where expiration is near or been reached (e.g. perishable goods, seasonal items, fashion trends, etc.). Alternatively, the sales volume prediction may underestimate the demand, thereby reducing company sales and impacting profitability as consumers are forced to shop elsewhere to purchase an out of stock product.

The use of RFID technology has the potential to increase company profitability by allowing the company to continuously monitor the supply of a product at a store. Using RFID technology allows a company to quickly respond to low store inventory without having to take physical inventory counts to ensure an adequate supply of goods while avoiding the risks associated in overstocking a product. Additionally, a company can monitor the sales rate of a product at a store, which can help the company predict future sales trends so that the company can make alterations within the supply chain as necessary to maintain an appropriate supply and ready availability of goods.

The increased demand for RFID technology has also created a need for a manufacturing method that can quickly and efficiently produce RFID inlays. There are various methods for applying RFID inlays to objects, including but not limited to applying a permanent adhesive, weaving the RFID inlay into an object, and/or stapling or otherwise mechanically affixing the RFID inlay to the object. However, current methods may have certain limitations when any adjustments or repositioning is needed with the RFID inlay. Currently, when the RFID inlay is attached incorrectly (in the wrong location, skewed, or splayed out of alignment) to an object, correcting the placement of the RFID inlay may either destroy the object or RFID inlay itself. As such, a need exists to adjust and reposition RFID inlays on objects.

SUMMARY

The embodiments of the present disclosure described below are not intended to be exhaustive or to limit the current disclosure to the precise forms disclosed in the following detailed description. Rather, the embodiments are chosen and described so that others skilled in the art may appreciate and understand the principles and practices of the present disclosure.

In many embodiments, an adjustable and repositionable RFID inlay is described herein. The RFID inlay may comprise: a) a substrate having a first side and a second side; b) an antenna at least partially disposed on the first side of the substrate, and c) an RFID chip at least partially disposed on the first side of the substrate; wherein a first adhesive is at least partially disposed on the RFID inlay; and wherein a second adhesive is at least partially disposed on the RFID inlay.

In many embodiments, the substrate comprises wood, textiles, plastic, paper, glass, metal, composites, or combinations thereof. In many embodiments, the antenna is comprised of a non-metallic conductor, a metal wire, a metal foil, a printed metallic ink, or combinations thereof.

In many embodiments, the first adhesive is at least partially disposed on the antenna and the RFID chip. In some embodiments, the first adhesive is a pressure sensitive adhesive.

In many embodiments, the second adhesive is an activatable adhesive. In some embodiments, the activatable adhesive is activated by heat, IR, UV, or combinations thereof. In some embodiments, the second adhesive is at least partially bonded to an object. In many embodiments, the object comprises wood, textiles, plastic, paper, glass, metal, composites, or combinations thereof.

In one exemplary embodiment, a RFID inlay is provided with different adhesive patterns for the first adhesive, the second adhesive, or both.

In some embodiments, the RFID inlay is used in an RFID tag. In other embodiments, the RFID inlay is used in an RFID label. In many embodiments, the RFID inlay is repositionable.

Also described herein is a method of positioning an RFID inlay with a first adhesive and a second adhesive described herein where the second adhesive is an activatable adhesive. In some embodiments, the method may further comprise repositioning the RFID inlay prior to activating the second adhesive to at least partially affix the RFID inlay to the object.

In many embodiments, a method of positioning an RFID inlay is described herein. In many embodiments, the method of positioning an RFID inlay may comprise the steps of: (a) positioning an RFID inlay onto an object, wherein the RFID inlay comprises: (i) a substrate having a first side and a second side; (ii) an antenna at least partially disposed on the first side of the substrate, and (iii) an RFID chip at least partially disposed on the first side of the substrate, wherein a first adhesive is at least partially disposed on the RFID inlay; and wherein a second adhesive is at least partially disposed on the RFID inlay; and (b) activating the second adhesive to at least partially affix the RFID inlay to the object. In some embodiments, the method further comprises repositioning the RFID inlay prior to activating the second adhesive.

BRIEF DESCRIPTION OF THE DRAWINGS

The disclosure references the appended drawings, wherein like numerals designate similar parts. Advantages of embodiments of the current disclosure will be apparent from the following detailed description of the exemplary embodiments thereof, which description should be considered in conjunction with the accompanying drawings in which like numerals indicate like elements, in which.

DETAILED DESCRIPTION

Aspects of the current disclosure are disclosed in the following description and related drawings directed to specific embodiments of the current disclosure. Alternate embodiments may be devised without departing from the spirit or the scope of the current disclosure. Additionally, well-known elements of exemplary embodiments of the current disclosure will not be described in detail or will be omitted so as not to obscure the relevant details of the current disclosure. Further, to facilitate an understanding of the description, discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the current disclosure", "embodiments" or "current disclosure" do not require that all embodiments of the current disclosure include the discussed feature, advantage or mode of operation.

The present disclosure generally relates to an RFID inlay. The RFID inlay may comprise: (a) a substrate having a first side and a second side; (b) an antenna at least partially disposed on the first side of the substrate, and (c) an RFID chip at least partially disposed on the first side of the substrate, wherein the wherein a first adhesive is at least partially disposed on the RFID inlay; and wherein a second adhesive is at least partially disposed on the RFID inlay. In many embodiments, the RFID inlay described herein is adjustable and repositionable.

In many embodiments, the substrate in the RFID inlay may be comprised wood, textiles, plastic, paper, glass, metal, composites, or combinations thereof. In one embodiment, the substrate is paper. In another embodiment, the substrate is polyester. In many embodiments, the substrate is continuous. A continuous substrate, as described herein, is one that is unbroken, whole, or without gaps or intervals. In other embodiments, the substrate is discontinuous. A discontinuous substrate, as described herein, is one that has gaps or intervals within the substrate.

In many embodiments, the antenna of the RFID inlay may be comprised of a non-metallic conductor, a metal wire, a metal foil, a printed metallic ink, or combinations thereof. In some embodiments, the non-metallic conductor is comprised of graphene. In other embodiments, the non-metallic conductor may be comprised of other materials. In many embodiments the metal wire, the metal foil, the printed metallic ink, or combinations thereof is comprised of silver, copper, aluminum, nickel, tin-bismuth, and combinations thereof. Other metal wires, metal foils, printed metallic inks, or combinations thereof are also contemplated.

In many embodiments, the first adhesive of the RFID inlay may be a temporary adhesive. In many embodiments, the first adhesive of the RFID inlay is a pressure sensitive adhesive. In some embodiments, the first adhesive of the RFID inlay is at least partially patterned. The pattern may be a regular or defined pattern or a random pattern. In other embodiments, the first adhesive of the RFID inlay is continuous. A continuous adhesive, as described herein, is an adhesive that is unbroken, whole, or without gaps or intervals. In many embodiments, the first adhesive of the RFID inlay may be comprised of a rubber adhesive, a silicone adhesive, an acrylic adhesive, an epoxy adhesive, a urethane adhesive, or combinations thereof. Other adhesive compositions are also contemplated. In many embodiments, the first adhesive of the RFID inlay is at least partially disposed on the antenna and the RFID chip. In other embodiments, the first adhesive of the RFID inlay completely covers the antenna and the RFID chip. In some embodiments, the first adhesive of the RFID inlay is at least partially disposed on the substrate. In other embodiments, the first adhesive of the RFID inlay completely covers the substrate. In many embodiments, the first adhesive may be at least partially bonded to a merchandise label or merchandise tag. In one embodiment, the merchandise label or merchandise tag is woven. In many embodiments, the second adhesive may be at least partially bonded to an object.

In many embodiments, the second adhesive of the RFID inlay may be an activatable adhesive. An activatable adhesive, as described herein, may be an adhesive that will not bond under typical conditions but is then bonded after exposure to certain conditions. An activatable adhesive may allow the user to control when bonding occurs. In many embodiments, the activatable adhesive used in the RFID inlay described herein may be activated by heat, IR, UV, or combinations thereof.

Additionally in many embodiments, the second adhesive of the RFID inlay may be at least partially bonded to an object. In other embodiments, the second adhesive of the RFID inlay may be completely bonded to an object. In many embodiments, the object comprises wood, textiles, plastic, paper, glass, metal, composites, or combinations thereof. However, other variations of the composition of objects are contemplated. In many embodiments, the object is the item to be protected by the RFID technology.

In many embodiments, the second adhesive of the RFID inlay may be at least partially patterned. In other embodiments, the second adhesive of the RFID inlay may be completely patterned. The pattern may be a regular or defined pattern, or alternatively a random pattern.

In some embodiments, the second adhesive of the RFID inlay may be on only a portion of the RFID inlay. In other embodiments, the second adhesive of the RFID inlay may be disposed on the entire RFID inlay. In many embodiments, the second adhesive of the RFID inlay is continuous. In other embodiments, the second adhesive of the RFID inlay is discontinuous.

In many embodiments, the second adhesive is comprised of a rubber adhesive, a silicone adhesive, an acrylic adhesive, an epoxy adhesive, a urethane adhesive, or combinations thereof. Other adhesive compositions are also contemplated.

Further, the RFID inlay (comprised of the substrate, the antenna, and the RFID chip) may have a first side and a second side. In some embodiments, the RFID inlay has a first side and a second side and the first side of the RFID inlay is the first side of the substrate, and the second side of the RFID inlay is the second side of the substrate.

In other embodiments, the RFID inlay has a first side and a second side and the first side of the RFID inlay is the second side of the substrate and the second side of the RFID inlay is the first side of the substrate.

A wet inlay may be formed once at least one adhesive (either the first adhesive or the second adhesive) has been at least partially disposed on the RFID inlay described herein.

In many embodiments, the RFID inlay is used in an RFID tag. In many embodiments, the RFID inlay is used in an RFID label. Other uses for the RFID are also contemplated.

In many embodiments, the RFID inlay described herein is repositionable. The RFID may be repositionable and adjustable in order to move the RFID inlay to a desired location. Once the RFID inlay is properly placed, the second adhesive may be activated in order to at least partially bond the RFID inlay to the object. In some embodiments, the second adhesive may be activated in order to completely bond the RFID inlay to the object.

Also provided herein are methods of positioning the RFID inlay described herein. In many embodiments, a method of positioning an RFID inlay comprises the steps of: (a) positioning the RFID inlay described herein onto an object; and (b) activating the second adhesive to at least partially affix the RFID inlay to the object. In some embodiments, the method further comprises repositioning the RFID inlay prior to activating the second adhesive to at least partially affix the RFID inlay to the object.

In many embodiments, a method of positioning an RFID inlay comprises the steps of: (a) positioning an RFID inlay onto an object, wherein the RFID inlay comprises: (i) a substrate having a first side and a second side; (ii) an antenna at least partially disposed on the first side of the substrate, and (iii) an RFID chip at least partially disposed on the first side of the substrate, wherein a first adhesive is at least partially disposed on the RFID inlay; and wherein a second adhesive is at least partially disposed on the RFID inlay; and (b) activating the second adhesive to at least partially affix the RFID inlay to the object. In many embodiments, the object for the method described herein comprises wood, textiles, plastic, paper, glass, metal, composites, or combinations thereof. Other materials for the object are also contemplated. In many embodiments, the object is protected by the RFID technology.

In many embodiments of the method, the substrate in the RFID inlay may be comprised wood, textiles, plastic, paper, glass, metal, composites, or combinations thereof. In one embodiment, the substrate is paper. In another embodiment, the substrate is polyester. In many embodiments, the substrate is continuous. A continuous substrate, as described herein, is one that is unbroken, whole, or without gaps or intervals. In other embodiments, the substrate is discontinuous. A discontinuous substrate, as described herein, is one that has gaps or intervals within the substrate.

In many embodiments of the method, the antenna of the RFID inlay may be comprised of a non-metallic conductor, a metal wire, a metal foil, a printed metallic ink, or combinations thereof. In some embodiments, the non-metallic conductor is comprised of graphene. In other embodiments, the non-metallic conductor may be comprised of other materials. In many embodiments, the metal wire, the metal foil, the printed metallic ink, or combinations thereof is comprised of silver, copper, aluminum, nickel, tin-bismuth, and combinations thereof. Other metal wires, metal foils, printed metallic inks, or combinations thereof are also contemplated.

In many embodiments of the method, the first adhesive of the RFID inlay may be a temporary adhesive. In many embodiments of the method, the first adhesive RFID inlay is a pressure sensitive adhesive. In some embodiments of the method, the first adhesive of the RFID inlay is at least partially patterned. The pattern may be a regular or defined pattern, or alternatively a random pattern. In other embodiments, the first adhesive of the RFID inlay is continuous. A continuous adhesive, as described herein, is an adhesive that is unbroken, whole, or without gaps or intervals. In many embodiments of the method, the first adhesive of the RFID inlay may be comprised of a rubber adhesive, a silicone adhesive, an acrylic adhesive, an epoxy adhesive, a urethane adhesive, or combinations thereof. Other adhesive compositions are also contemplated.

In many embodiments, the first adhesive may be at least partially bonded to a merchandise label or merchandise tag. In one embodiment, the merchandise label or merchandise tag is woven. In many embodiments, the second adhesive may be at least partially bonded to an object.

In many embodiments of the method, the second adhesive of the RFID inlay is at least partially disposed on the antenna and the RFID chip. In other embodiments, the second adhesive of the RFID inlay completely covers the antenna and the RFID chip. In some embodiments, the second adhesive of the RFID inlay is at least partially disposed on the substrate. In other embodiments, the second adhesive of the RFID inlay completely covers the substrate.

In many embodiments of the method, the second adhesive of the RFID inlay may be an activatable adhesive. An activatable adhesive, as described herein, may be an adhesive that will not bond under typical conditions but is then bonded after exposure to certain conditions. An activatable adhesive may allow the user to control when bonding occurs. In many embodiments of the method, the activatable adhesive used in the RFID inlay described herein may be activated by heat, IR, UV, or combinations thereof.

Additionally in many embodiments of the method, the second adhesive of the RFID inlay may be at least partially bonded to an object. In other embodiments, the second adhesive of the RFID inlay may be completely bonded to an object. In many embodiments, the object is the item to be protected by the RFID technology.

In many embodiments of the method, the second adhesive of the RFID inlay may be at least partially patterned. In other embodiments, the second adhesive of the RFID inlay may be completely patterned. The pattern may be a regular or defined pattern, or alternatively a random pattern.

In some embodiments of the method, the second adhesive of the RFID inlay may be on only a portion of the RFID inlay. In other embodiments of the method, the second adhesive of the RFID inlay may be disposed on the entire RFID inlay. In many embodiments of the method, the second adhesive of the RFID inlay is continuous. In other embodiments of the method, the second adhesive of the RFID inlay is discontinuous.

In many embodiments of the method, the second adhesive is comprised of a rubber adhesive, a silicone adhesive, an acrylic adhesive, an epoxy adhesive, a urethane adhesive, or combinations thereof. Other adhesive compositions are also contemplated.

In some embodiments of the method, the RFID inlay has a first side and a second side and the first side of the RFID inlay is the first side of the substrate, and the second side of the RFID inlay is the second side of the substrate.

In other embodiments of the method, the RFID inlay has a first side and a second side and the first side of the RFID inlay is the second side of the substrate and the second side of the RFID inlay is the first side of the substrate.

In many embodiments of the method, the RFID inlay in the method described herein is used in an RFID tag. In many embodiments, the RFID inlay in the method described herein is used in an RFID label. Other uses for the RFID are also contemplated.

In many embodiments of the method, the RFID inlay in the method described herein is repositionable. The RFID may be repositionable and adjustable in order to move the RFID inlay to a desired location. Once the RFID inlay is properly placed, the second adhesive may be activated in order to at least partially bond the RFID inlay to the object. In some embodiments of the method, the second adhesive may be activated in order to completely bond the RFID inlay to the object.

Figure 1:
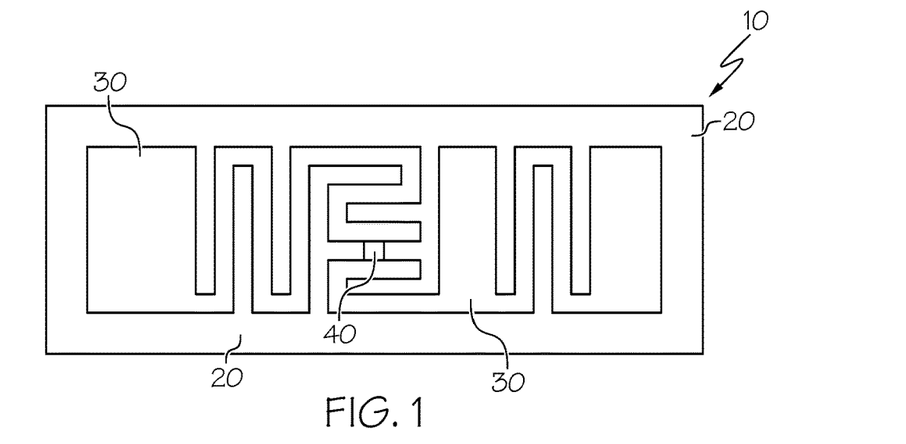
FIG. 1 illustrates an exemplary configuration of the RFID inlay.

Referring now to FIG. 1 the RFID inlay 10 is illustrated. The RFID inlay 10 comprises a) a substrate 20 having a first side and a second side; b) an antenna 30 at least partially disposed on the first side of the substrate 20, and c) an RFID chip 40 at least partially disposed on the first side of the substrate 20. Although a particular antenna configuration is shown in FIG. 1, the design of the antenna 30 is not limited to that described herein. After the RFID inlay 10 is formed, adhesives may be disposed onto the RFID inlay to form a wet inlay (as shown in FIG. 2A).

Figure 2A:
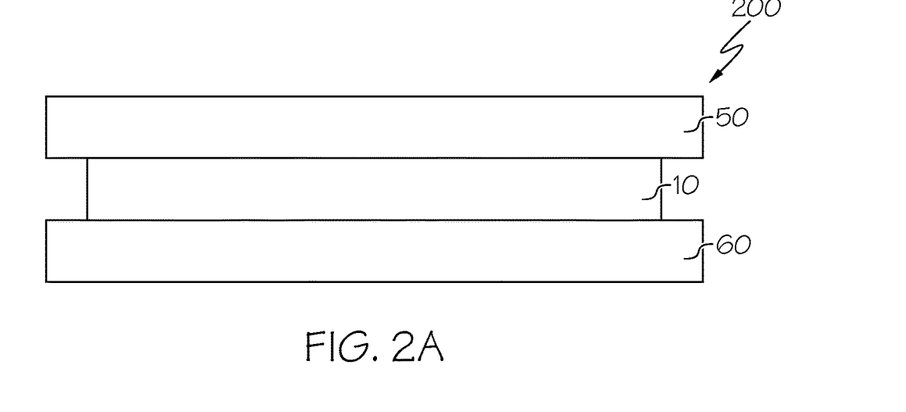
FIG. 2A illustrates an exemplary configuration of the RFID inlay.

FIG. 2A provides a cross-sectional view of the wet inlay 200 described herein. The wet inlay 200 of FIG. 2A is comprised of the RFID inlay 10 (described herein and in FIG. 1) with the first adhesive 50 and the second adhesive 60 at least partially disposed on opposite sides of the RFID inlay 10. The RFID inlay 10 has a first side and a second side. As shown in FIG. 2A, the first adhesive 50 is at least partially disposed on the first side of the RFID inlay 10 and the second adhesive 60 is at least partially disposed on the second side of the RFID inlay 10. The second adhesive 60 may be repositionable on an object (not shown) until it is activated.

Figure 2B:
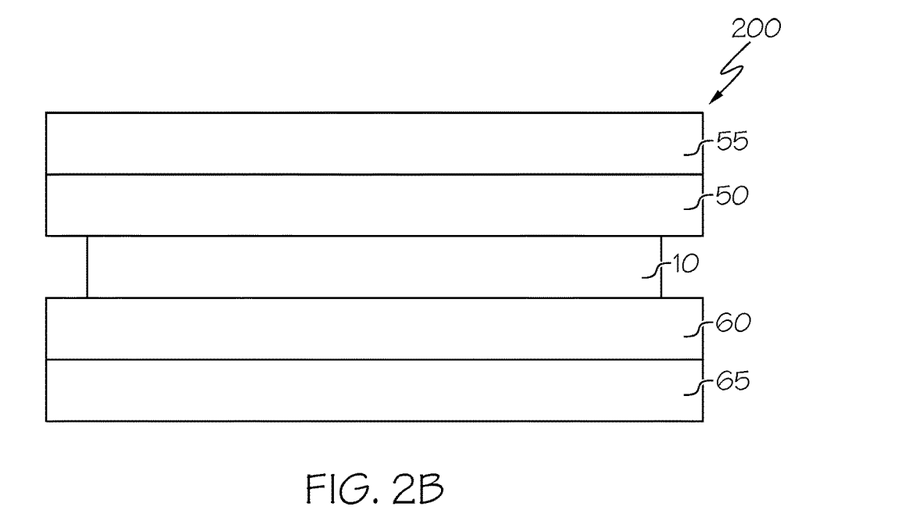
FIG. 2B illustrates an exemplary configuration of the RFID inlay.

FIG. 2B provides the cross-sectional view of the wet inlay 200 described in FIG. 2A but provides optional liners for both the first adhesive 50 and the second adhesive 60. Both of the liners (meaning the first adhesive liner 55 and the second adhesive liner 65) act to protect the adhesive layers (meaning both the first adhesive 50 and the second adhesive 60) from any damage prior to application. Specifically, the first adhesive liner 55 is at least partially disposed on the first adhesive 50. Additionally, the second adhesive liner 65 is at least partially disposed on the second adhesive 60.

Figure 3A:
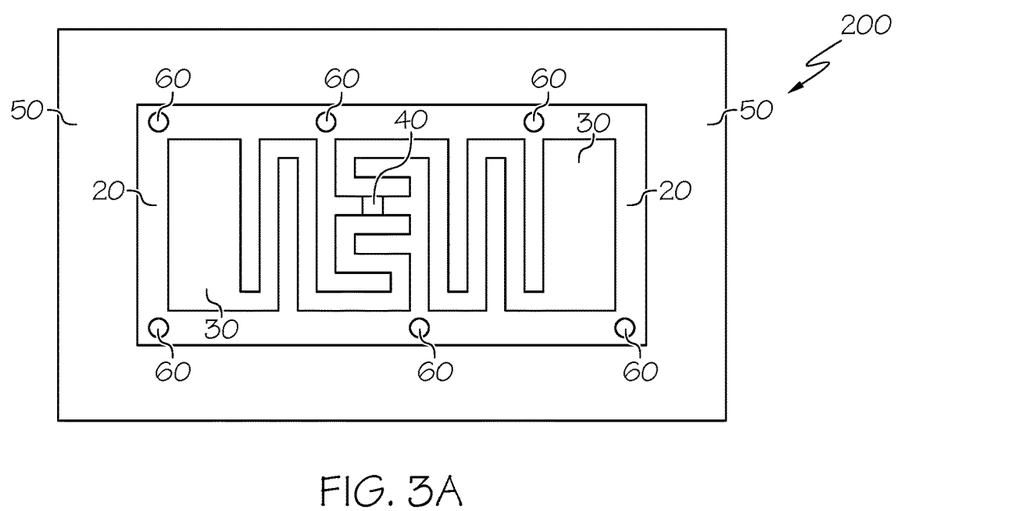
FIG. 3A illustrates an exemplary configuration of the RFID inlay.

FIG. 3A provides one exemplary configuration of the wet inlay 200. In FIG. 3A, the first adhesive 50 is larger than the substrate 20, providing a perimeter of adhesive around the substrate 20. The first adhesive 50 is continuous. In this embodiment, the second adhesive 60 is provided in a discrete and discontinuous form. The second adhesive 60 may hold the wet inlay 200 for positioning and any repositioning necessary until the second adhesive 60 is activated to be disposed onto the object (not shown).

Figure 3B:
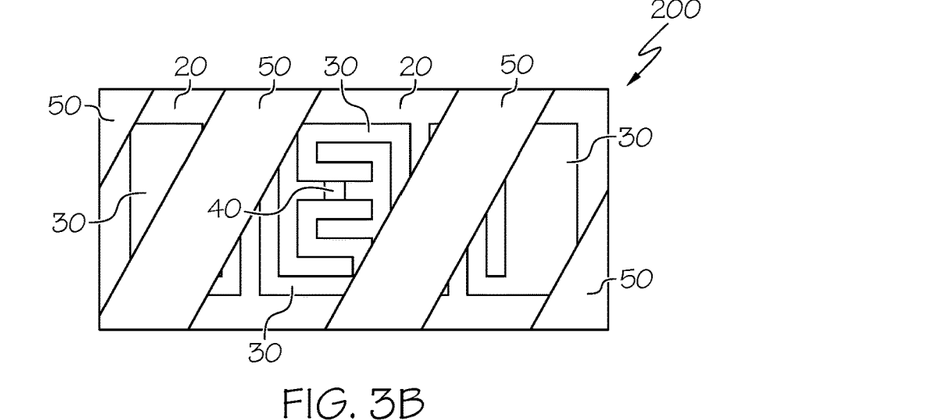
FIG. 3B illustrates an exemplary configuration of the RFID inlay.

FIG. 3B provides an additional embodiment of the wet inlay 200 with an alternating pattern of the first adhesive 50. However, the second adhesive 60 on the opposite side of the wet inlay 200, so it is not shown in FIG. 3B. The first adhesive 50, in this embodiment, is a patterned adhesive and is discontinuous. The portions of the RFID inlay 10, including the RFID chip 40, the antenna 30, and the substrate 20 are shown. In this embodiment, the second adhesive 60 may be provided in a patterned, discrete, continuous, and/or discontinuous form if shown on the opposite side of the wet inlay 200.

Figure 3C:
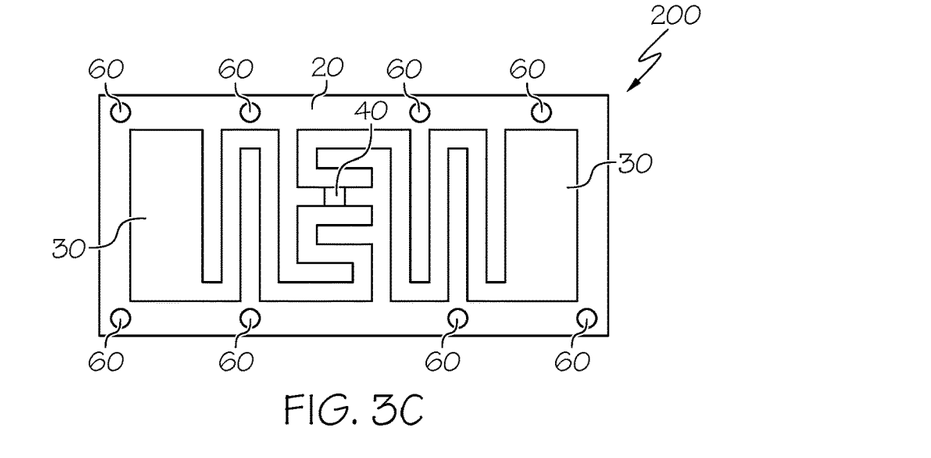
FIG. 3C illustrates an exemplary configuration of the RFID inlay.

FIG. 3C provides still another embodiment of the adhesive pattern where the second adhesive 60 is patterned and discontinuous for the wet inlay 200. The portions of the RFID inlay 10, including the RFID chip 40, the antenna 30, and the substrate 20 are shown. For this figure, the second adhesive 60 has random patterns. However, a regular or defined pattern may be contemplated as well.

Figure 4:
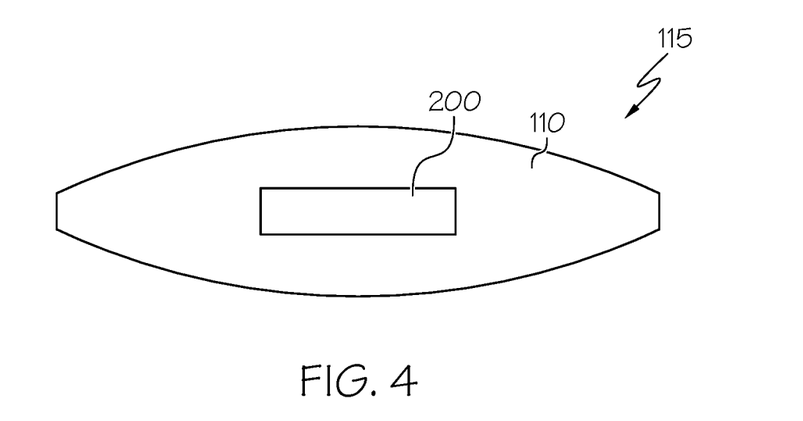
FIG. 4 illustrates an exemplary configuration of the RFID tag.

FIG. 4 provides an RFID inlay 10 described herein that may be embedded into a tag material 110 to form and RFID tag 115. Since the tag material 110 encapsulates the RFID inlay 10, it may protect the RFID tag 115. In some embodiments, the tag material 110 may comprise plastic. In one embodiment, the plastic may be polyethylene terephthalate (PET). In some embodiments, the RFID tag 115 may also be printed with words, pictures, or other indicia on the tag material 110. For the methods described herein, the RFID inlay 10 is used in the RFID tag 115.

Figure 5:
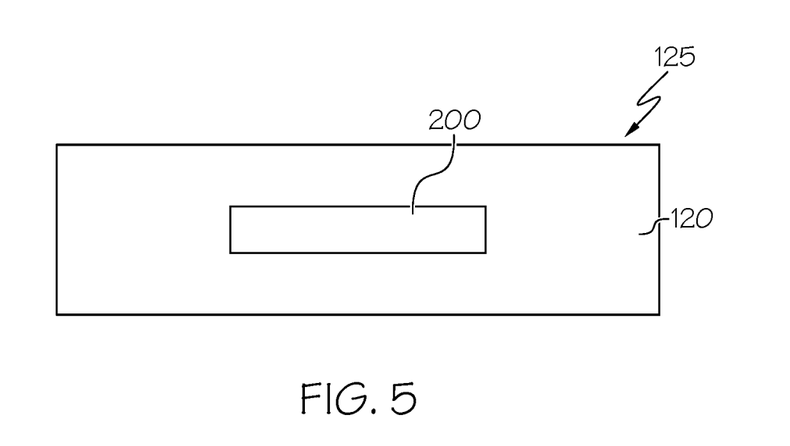
FIG. 5 illustrates an exemplary configuration of the RFID label.

FIG. 5 provides an RFID inlay 10 described herein that may also be embedded into a label material 120 to form an RFID label 125. In many embodiments, the label material 120 is paper. In some embodiments, the label material 120 may be substituted with a plastic. In other embodiments not shown, the RFID inlay 10 is printed onto other materials that are not paper. In some embodiments, the RFID label 125 may also be printed with words, pictures, or other indicia on the label material 120. For the methods described herein, the RFID inlay 10 is used in the RFID label 125.

EXAMPLES

The following are example embodiments of the disclosure with the understanding that further example embodiments may be provided in accordance with the disclosure. Furthermore, any of the embodiments discussed below may be used alone or in combination with any of the other embodiments discussed below.

Embodiment 1. A RFID inlay comprising: (a) a substrate having a first side and a second side; (b) an antenna at least partially disposed on the first side of the substrate, and (c) an RFID chip at least partially disposed on the first side of the substrate, wherein a first adhesive is at least partially disposed on the RFID inlay; and wherein a second adhesive is at least partially disposed on the RFID inlay.

Embodiment 2. The RFID inlay of Embodiment 1, wherein the substrate comprises wood, textiles, plastic, paper, glass, metal, composites, or combinations thereof.

Embodiment 3. The RFID inlay of any of the Embodiments 1-2, wherein the substrate is continuous.

Embodiment 4. The RFID inlay of any of the Embodiments 1-3, wherein the antenna is comprised of a non-metallic conductor, a metal wire, a metal foil, a printed metallic ink, or combinations thereof.

Embodiment 5. The RFID inlay of Embodiment 4, wherein the non-metallic conductor is comprised of graphene.

Embodiment 6. The RFID inlay of Embodiment 4, wherein the metal wire, the metal foil, the printed metallic ink, or combinations thereof is comprised of silver, copper, aluminum, nickel, tin-bismuth, and combinations thereof.

Embodiment 7. The RFID inlay of any of the Embodiments 1-6, wherein the first adhesive is a temporary adhesive.

Embodiment 8. The RFID inlay of any of the Embodiments 1-7, wherein the first adhesive is a pressure sensitive adhesive.

Embodiment 9. The RFID inlay of any of the Embodiments 1-8, wherein the first adhesive is at least partially patterned.

Embodiment 10. The RFID inlay of any of the Embodiments 1-9, wherein the first adhesive is continuous.

Embodiment 11. The RFID inlay of any of the Embodiments 1-10, wherein the first adhesive is comprised of a rubber adhesive, a silicone adhesive, an acrylic adhesive, an epoxy adhesive, a urethane adhesive, or combinations thereof.

Embodiment 12. The RFID inlay of any of the Embodiments 1-11, wherein a first adhesive is at least partially disposed on the antenna and the RFID chip.

Embodiment 13. The RFID inlay of any of the Embodiments 1-12, wherein the second adhesive is an activatable adhesive.

Embodiment 14. The RFID inlay of Embodiment 13, wherein the activatable adhesive is activated by heat, IR, UV, or combinations thereof.

Embodiment 15. The RFID inlay of any of the Embodiments 1-14, wherein the second adhesive is at least partially bonded to an object.

Embodiment 16. The RFID inlay of Embodiment 15, wherein the object comprises wood, textiles, plastic, paper, glass, metal, composites, or combinations thereof.

Embodiment 17. The RFID inlay of any of the Embodiments 1-16, wherein the second adhesive is at least partially patterned.

Embodiment 18. The RFID inlay of any of the Embodiments 1-17, wherein the second adhesive is continuous.

Embodiment 19. The RFID inlay of any of the Embodiments 1-18, wherein the second adhesive is comprised of a rubber adhesive, a silicone adhesive, an acrylic adhesive, an epoxy adhesive, a urethane adhesive, or combinations thereof.

Embodiment 20. The RFID inlay of any of the Embodiments 1-19, wherein the RFID inlay has a first side and a second side and wherein the first side of the RFID inlay is the first side of the substrate.

Embodiment 21. The RFID inlay of Embodiment 20, wherein the RFID inlay has the first side and the second side and wherein the second side of the RFID inlay is the second side of the substrate.

Embodiment 22. The RFID inlay of any of the Embodiments 1-19, wherein the RFID inlay has a first side and a second side and wherein the first side of the RFID inlay is the second side of the substrate.

Embodiment 23. The RFID inlay of Embodiment 22, wherein the RFID inlay has the first side and the second side and wherein the second side of the RFID inlay is the first side of the substrate.

Embodiment 24. The RFID inlay of any of the Embodiments 1-23, where the RFID inlay is used in an RFID tag.

Embodiment 25. The RFID inlay of any of the Embodiments 1-24, where the RFID inlay is used in an RFID label.

Embodiment 26. The RFID inlay of any of the Embodiments 1-21, where the RFID inlay is repositionable.

Embodiment 27. A method of positioning an RFID inlay comprising the steps of: (a) positioning the RFID inlay of any of the Embodiments 1-22 onto an object; and (b) activating the second adhesive to at least partially affix the RFID inlay to the object.

Embodiment 28. The method of Embodiment 23, further comprising repositioning the RFID inlay prior to activating the second adhesive to at least partially affix the RFID inlay to the object.

Embodiment 29. A method of positioning an RFID inlay comprising the steps of: (a) positioning an RFID inlay onto an object, wherein the RFID inlay comprises: (i) a substrate having a first side and a second side; (ii) an antenna at least partially disposed on the first side of the substrate, and (iii) an RFID chip at least partially disposed on the first side of the substrate, wherein a first adhesive is at least partially disposed on the RFID inlay; and wherein a second adhesive is at least partially disposed on the RFID inlay; and (b) activating the second adhesive to at least partially affix the RFID inlay to the object.

Embodiment 30. The method of Embodiment 29, wherein the object comprises wood, textiles, plastic, paper, glass, metal, composites, or combinations thereof.

Embodiment 31. The method of any of the Embodiments 29-30, wherein the substrate comprises wood, textiles, plastic, paper, glass, metal, composites, or combinations thereof.

Embodiment 32. The method of any of the Embodiments 29-31, wherein the substrate is continuous.

Embodiment 33. The method of any of the Embodiments 29-32, wherein the antenna is comprised of non-metallic conductor, a metal wire, a metal foil, a printed metallic ink, or combinations thereof.

Embodiment 34. The method of Embodiment 33, wherein the non-metallic conductor is comprised of graphene.

Embodiment 35. The method of Embodiment 33, wherein the metal wire, the metal foil, the printed metallic ink, or combinations thereof is comprised of silver, copper, aluminum, nickel, tin-bismuth, and combinations thereof.

Embodiment 36. The method of any of the Embodiments 29-35, wherein the first adhesive is a temporary adhesive.

Embodiment 37. The method of any of the Embodiments 29-36, wherein the first adhesive is a pressure sensitive adhesive.

Embodiment 38. The method of any of the Embodiments 29-37, wherein the first adhesive is at least partially patterned.

Embodiment 39. The method of any of the Embodiments 29-38, wherein the first adhesive is continuous.

Embodiment 40. The method of any of the Embodiments 29-39, wherein the first adhesive is comprised of a rubber adhesive, a silicone adhesive, an acrylic adhesive, an epoxy adhesive, a urethane adhesive, or combinations thereof.

Embodiment 41. The method of any of the Embodiments 29-40, wherein the first adhesive is at least partially disposed on the antenna and the RFID chip.

Embodiment 42. The method of any of the Embodiments 29-41, wherein the second adhesive is an activatable adhesive.

Embodiment 43. The method of Embodiment 42, wherein the activatable adhesive is activated by heat, IR, UV, or combinations thereof.

Embodiment 44. The method of any of the Embodiments 29-43, wherein the second adhesive is at least partially bonded to the object.

Embodiment 45. The method of any of the Embodiments 29-44, wherein the second adhesive is at least partially patterned.

Embodiment 46. The method of any of the Embodiments 29-45, wherein the second adhesive is continuous.

Embodiment 47. The method of any of the Embodiments 29-46, wherein the second adhesive is comprised of a rubber adhesive, a silicone adhesive, an acrylic adhesive, an epoxy adhesive, a urethane adhesive, or combinations thereof.

Embodiment 48. The method of any of the Embodiments 29-47, wherein the RFID inlay has a first side and a second side and wherein the first side of the RFID inlay is the first side of the substrate Embodiment 49. The method of Embodiment 48, wherein the RFID inlay has a first side and a second side and wherein the second side of the RFID inlay is the second side of the substrate.

Embodiment 50. The method of any of the Embodiments 29-47, wherein the RFID inlay has a first side and a second side and wherein the first side of the RFID inlay is the second side of the substrate Embodiment 51. The method of Embodiment 50, wherein the RFID inlay has a first side and a second side and wherein the second side of the RFID inlay is the first side of the substrate.

Embodiment 52. The method of any of the Embodiments 29-51, where the RFID inlay is used in an RFID tag.

Embodiment 53. The method of any of the Embodiments 29-52, where the RFID inlay is used in an RFID label.

Embodiment 54. The method of any of the Embodiments 29-53, further comprising repositioning the RFID inlay prior to activating the second adhesive.

The foregoing description and accompanying figures illustrate the principles, preferred embodiments and modes of operation of the current disclosure. However, the current disclosure should not be construed as being limited to the particular embodiments discussed above. Additional variations of the embodiments discussed above will be appreciated by those skilled in the art (for example, features associated with certain configurations of the current disclosure may instead be associated with any other configurations of the current disclosure, as desired).

While the disclosure has been described in detail, modifications within the spirit and scope of the disclosure will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the current disclosure and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the disclosure.

What is claimed is:

1. A RFID inlay, comprising:
a substrate having a first side and a second side;
an antenna at least partially disposed on the first side of the substrate, and
an RFID chip at least partially disposed on the first side of the substrate,
wherein the RFID inlay has a first side and a second side,
wherein the first side of the RFID inlay is the first side of the substrate, and the second side of the RFID inlay is the second side of the substrate,
wherein a first adhesive is at least partially disposed on the first side of the RFID inlay,
wherein a second adhesive is at least partially disposed on the second side of the RFID inlay, and
wherein the first adhesive is a pressure sensitive adhesive and the second adhesive is an activatable adhesive.

2. The RFID inlay of claim 1, wherein the substrate comprises wood, textiles, plastic, paper, glass, metal, composites, or combinations thereof.

3. The RFID inlay of claim 1, wherein the substrate is continuous.

4. The RFID inlay of claim 1, wherein the antenna is comprised of a non-metallic conductor, a metal wire, a metal foil, a printed metallic ink, or combinations thereof.

5. The RFID inlay of claim 4, wherein the non-metallic conductor is comprised of graphene.

6. The RFID inlay of claim 4, wherein the metal wire, the metal foil, the printed metallic ink, or combinations thereof is comprised of silver, copper, aluminum, nickel, tin-bismuth, and combinations thereof.

7. The RFID inlay of claim 1, wherein the first adhesive is a temporary adhesive.

8. The RFID inlay of claim 1, wherein the first adhesive is at least partially patterned.

9. The RFID inlay of claim 1, wherein the first adhesive is continuous.

10. The RFID inlay of claim 1, wherein the first adhesive is comprised of a rubber adhesive, a silicone adhesive, an acrylic adhesive, an epoxy adhesive, a urethane adhesive, or combinations thereof.

11. The RFID inlay of claim 1, wherein the first adhesive is at least partially disposed on the antenna and the RFID chip.

12. The RFID inlay of claim 1, wherein the activatable adhesive is activated by heat, IR, UV, or combinations thereof.

13. The RFID inlay of claim 1, wherein the second adhesive is at least partially bonded to an object.

14. The RFID inlay of claim 13, wherein the object comprises wood, textiles, plastic, paper, glass, metal, composites, or combinations thereof.

15. The RFID inlay of claim 1, wherein the second adhesive is at least partially patterned.

16. The RFID inlay of claim 1, wherein the second adhesive is continuous.

17. The RFID inlay of claim 1, wherein the second adhesive is comprised of a rubber adhesive, a silicone adhesive, an acrylic adhesive, an epoxy adhesive, a urethane adhesive, or combinations thereof.

18. The RFID inlay of claim 1, where the RFID inlay is used in an RFID tag.

19. The RFID inlay of claim 1, where the RFID inlay is used in an RFID label.

20. The RFID inlay of claim 1, where the RFID inlay is repositionable.

21. A method of positioning an RFID inlay comprising the steps of:
positioning an RFID inlay onto an object, wherein the RFID inlay comprises:
a substrate having a first side and a second side;
an antenna at least partially disposed on the first side of the substrate; and
an RFID chip at least partially disposed on the first side of the substrate,
wherein the RFID inlay has a first side and a second side,
wherein the first side of the RFID inlay is the first side of the substrate, and the second side of the RFID inlay is the second side of the substrate,
wherein a first adhesive is at least partially disposed on the first side of the RFID inlay[H] the first adhesive being a pressure sensitive adhesive, and
wherein a second adhesive is at least partially disposed on the second side of the RFID inlay, the second adhesive being an activatable adhesive; and
activating the second adhesive to at least partially affix the RFID inlay to the object.

22. The method of claim 21, wherein the object comprises wood, textiles, plastic, paper, glass, metal, composites, or combinations thereof.

23. The method of claim 21, wherein the substrate comprises wood, textiles, plastic, paper, glass, metal, composites, or combinations thereof.

24. The method of claim 21, wherein the substrate is continuous.

25. The method of claim 21, wherein the antenna is comprised of non-metallic conductor, a metal wire, a metal foil, a printed metallic ink, or combinations thereof.

26. The method of claim 25, wherein the non-metallic conductor is comprised of graphene.

27. The method of claim 25, wherein the metal wire, the metal foil, the printed metallic ink, or combinations thereof is comprised of silver, copper, aluminum, nickel, tin-bismuth, and combinations thereof.

28. The method of claim 21, wherein the first adhesive is a temporary adhesive.

29. The method of claim 21, wherein the first adhesive is at least partially patterned.

30. The method of claim 21, wherein the first adhesive is continuous.

31. The method of claim 21, wherein the first adhesive is comprised of a rubber adhesive, a silicone adhesive, an acrylic adhesive, an epoxy adhesive, a urethane adhesive, or combinations thereof.

32. The method of claim 21, wherein the first adhesive is at least partially disposed on the antenna and the RFID chip.

33. The method of claim 21, wherein the activatable adhesive is activated by heat, IR, UV, or combinations thereof.

34. The method of claim 21, wherein the second adhesive is at least partially bonded to the object.

35. The method of claim 21, wherein the second adhesive is at least partially patterned.

36. The method of claim 21, wherein the second adhesive is continuous.

37. The method of claim 21, wherein the second adhesive is comprised of a rubber adhesive, a silicone adhesive, an acrylic adhesive, an epoxy adhesive, a urethane adhesive, or combinations thereof.

38. The method of claim 21, where the RFID inlay is used in an RFID tag.

39. The method of claim 21, where the RFID inlay is used in an RFID label.

40. The method of claim 21, further comprising repositioning the RFID inlay prior to activating the second adhesive.

* * * * *